(12) United States Patent
Aoyagi

(10) Patent No.: US 6,269,915 B1
(45) Date of Patent: Aug. 7, 2001

(54) PAD CLIP FOR A DISC BRAKE

(75) Inventor: Shinji Aoyagi, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/447,418

(22) Filed: Nov. 23, 1999

(30) Foreign Application Priority Data

Nov. 26, 1998 (JP) .................................................. 10-336258

(51) Int. Cl.⁷ ......................... F16D 65/097; F16D 55/224
(52) U.S. Cl. .................................. 188/73.38; 188/205 A; 188/73.36
(58) Field of Search ............................. 188/73.31, 73.38, 188/73.37, 205 A, 73.36

(56) References Cited

U.S. PATENT DOCUMENTS 5,941,348 * 8/1999 Matsumoto et al. ............... 188/73.38
6,003,642 * 12/1999 Mori et al. ......................... 188/73.37

FOREIGN PATENT DOCUMENTS

| 57-149337 | 3/1956 | (JP) . |
| 60-21559 | 6/1985 | (JP) . |
| 8184339 | * 7/1996 | (JP) . |
| 9-229112 | 9/1997 | (JP) . |
| 161401 | * 6/2000 | (JP) . |

* cited by examiner

*Primary Examiner*—Douglas C. Butler
(74) *Attorney, Agent, or Firm*—Morgan, Lewis & Bockius LLP

(57) ABSTRACT

A pad clip for a disc brake including at least one friction pad and a support member. The pad clip comprises a first U-shaped portion, a second U-shaped portion, and a third side portion. The first U-shaped portion includes a first base portion and first side portions, and is disposed between side edge portions of the friction pad and anchor portions of the support member. The second U-shaped portion includes a second base portion, second side portions and a second opening portion, and is connected to one of the first side portions of the first U-shaped portion. The third side portion is connected to the second U-shaped portion, and is disposed substantially rectangularly to one of second side portions of the second U-shaped portion and parallel to the first base portion of the first U-shaped portion. The third side portion is positioned closer to the friction pad than the first base portion of the first U-shaped portion.

8 Claims, 5 Drawing Sheets

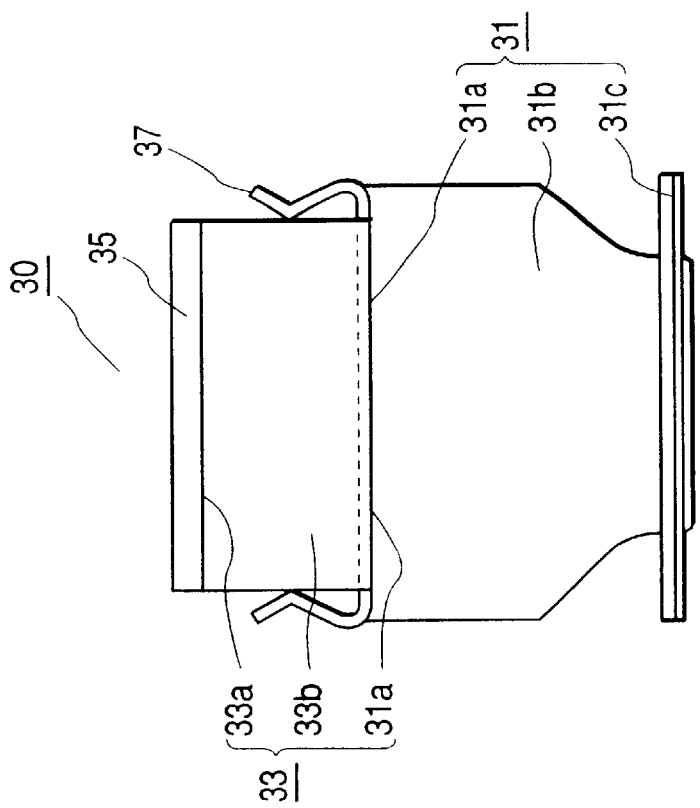
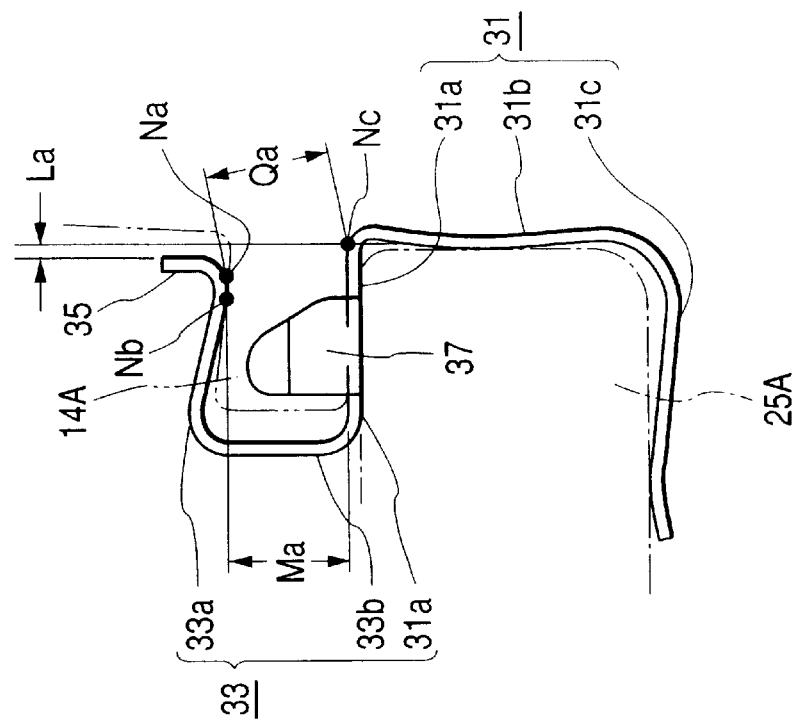

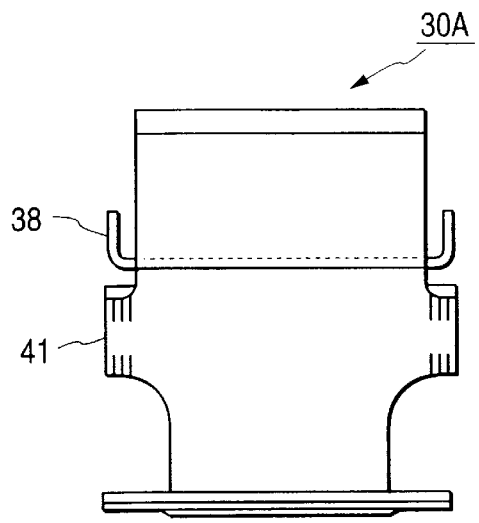
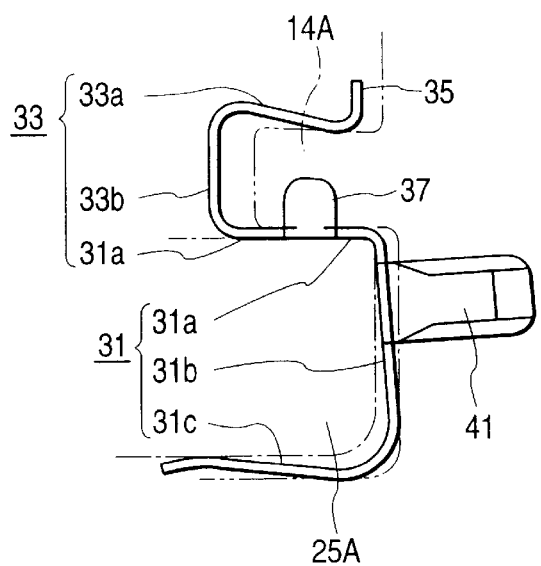
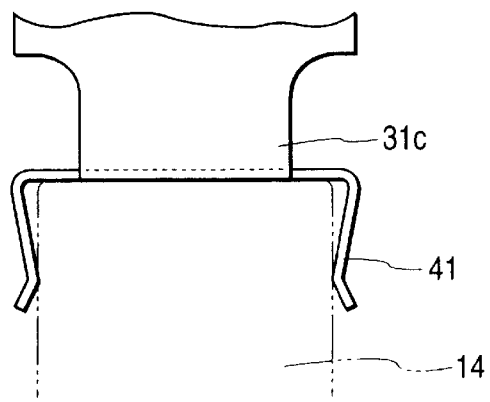

PRIOR ART

PAD CLIP FOR A DISC BRAKE

BACKGROUND OF THE INVENTION

1. Field of the Invention

The present invention relates to a pad clip for a disc brake of a vehicle. More particularly, the present invention relates to a pad clip improved such that no rattling is present between the pad clip and a friction pad, thereby suppressing generation of vibrations and noisy sounds and providing an increased durability of the disc brake.

2. Description of the Related Art

In a conventional disc brake, a pair of friction pads are slidably mounted on a support member so as to forcibly press a rotor. When the friction pads forcibly press the rotor with the aid of a caliper and a hydraulic cylinder, the friction pads rotate with rotation of the rotor, and the support member receives side edges of the friction pads to effect braking. Since the friction pads are moved so as to be brought into contact with the rotor surfaces, pad clips are installed in anchor portions between the friction pads and the support member in order to reduce a sliding resistance.

The pad clip is put on the anchor face of the support member, which faces each side edge of the friction pad, and it is shaped conforming to a shape of the anchor portions of the support member. The pad clip is extended up to the inner periphery side of each friction pad. At the end of the extended part of the pad clip, there is provided a spring portion which engages with the corner of the inner peripheral side of the friction pad in the run-in side of the rotor. An example of this is disclosed in JP-A-9-229112. As shown in FIG. 7, a pad clip 116 is inserted between a convex portion 112a which transmits a brake torque when the vehicle moves back, and a concave portion 113a. The pad clip 116 includes a first spring portion 116a retained on a support member 113 to urge the convex portion 112a in the rotational and radial directions of the rotor. The first spring portion 116a includes a tongue 116b elastically contacting with the wall 113a1 of the concave portion 113a, which is directed in the radial direction of the rotor. An end 116c of the pad clip which is opposite to the first spring portion 116a includes a second spring portion 116d shaped like a tongue. In a state that the pad clip 116 is installed to the support member 113, the second spring portion 116d is put into a groove 113c, thereby resiliently restricting the rotation of the pad clip 116, which is caused by the first spring portion 116a. The groove 113c is formed in a wall 113a2 of the concave portion 113a of the support member 113. The structure thus constructed prevents the leading edge of the end 116c from contacting the convex portion 112a, and the end 116c does not act as a spring between the support member 113 and the convex portion 112a. As a result, noisy sounds caused by vibrations of the wheels during the running of the vehicle and noisy sounds during the braking operation can be reduced by inexpensive means.

Another example is disclosed in JP-A-57-149337U. As shown in FIGS. 8A and 8B, a pad clip 153 is installed between each end of a friction pad 151 and a support member 152 such that the pad clip ranges from the outer peripheral surface of the friction pad 151 to the inner periphery surface by way of the side end face, to thereby cover the end portion of the friction pad 151. The end of the extending portion of the pad clip 153 extended to the inner periphery portion of the friction pad 151 includes a plate extending from the body of the pad clip 153 in a T-shape in the thickness direction of the friction pad 151. This plate is bent to form a spring portion 154. The spring portion 154 is extended to the underside of the friction pad 151, and urges the inner peripheral surface of the friction pad 151 in the radial direction of the rotor. Therefore, the friction pad 151 is separated from the inner peripheral surface of the support member 152. When the friction pad 151 forcibly presses the rotor and rotates together with the rotor, a rotational moment is generated in the friction pad 151 and a couple of forces to turn the friction pad 151 about the pressed portion are generated. At this time, the spring portion 154 generates an urging force as a counter force to the couple of forces. The body of the pad clip 153 extending to the inner peripheral surface of the friction pad 151 is cut shaped like U to form a raised piece 155 so as to lift the body of the pad clip 153 above from the surface of the support member 152. The raised piece 155 is in direct contact with the surface of the support member 152. With provision of the raised piece 155, a gap between the inner peripheral surface of the friction pad 151 and the surface of the support member 152 opposite to the former is reduced, whereby the spring constant of the spring portion 154 is reduced.

In the conventional U-shaped pad clip 116 described in the publication of JP-A-9-229112, the first spring portion 116a is assembled to the convex portion 112a, and it is used while being bent. With this, the gap is reduced. When a force acts on the first spring portion 116a, a reaction force is generated therein and utilized to reduce rattle sound. At this time, the pad clip 116 and the convex portion 112a of the friction pad are coupled together. Therefore, the former forcibly hits the support member 113. This reduces an endurance of the pad clip 116. Further, the groove 113c is formed in the wall 113a2 of the concave portion 113a of the support member 113, and the second spring portion 116d is brought into engagement with the groove 113c. This makes the structure complicated and difficult to assemble, and this also increase the step of manufacturing steps.

In the pad clip 153 described in the publication of JP-A-57-149337U, the spring portion 154 is indispensably used which is formed by bending the T-shaped plate which is extended to the inner peripheral surface of the friction pad 151 beyond the anchor face by the friction pad 151 and the support member 152, and to under the inner peripheral surface of the friction pad 151. Use of the spring portion 154 gives rise to difficulty in a plate forming process of the spring portion. A satisfactory length ranging from the convex-concave fitting structure to the inner peripheral portion of the friction pad 151 must be secured. This results in consumption of much material, and leads to increase of cost to manufacture. The raised piece 155 is formed in the body of the pad clip 153 in order to reduce the spring constant of the spring portion 154. Forces applied to the spring portion 154 act on the raised piece 155. In this case, the raised piece 155 receives all the forces, and as a result, problem exists in its strength.

SUMMARY OF THE INVENTION

Accordingly, an object of the present invention is to provide a pad clip for a disc brake in which no rattling is present between the pad clip and the friction pad, thereby suppressing generation of vibrations and noisy sounds and improving the durability of the disc brake.

To achieve the above object, there is provided a pad clip for a disc brake including at least one friction pad and a support member. The pad clip comprises a first U-shaped portion, a second U-shaped portion, and a third side portion. The first U-shaped portion includes a first base portion and first side portions, and is disposed between side edge portions of the friction pad and anchor portions of the support member. The second U-shaped portion includes a second base portion, second side portions and a second opening portion, and is connected to one of the first side portions of the first U-shaped portion. The third side portion is connected to the second U-shaped portion, and is disposed substantially rectangularly to one of second side portions of the second U-shaped portion and parallel to the first base portion of the first U-shaped portion. The third side portion is positioned closer to the friction pad than the first base portion of the first U-shaped portion.

It is preferable that the first U-shaped portion further includes first holder portions disposed on the first side portions of the first U-shaped portion. More preferably, the first holder portions are V-shaped.

It is also preferable that the first U-shaped portion further includes second holder portions on the first base portion of the first U-shaped portion.

Furthermore, it is preferable that the width of the second opening portion of the second U-shaped portion is narrower than the width of the second base portion of the second U-shaped portion.

In the pad clip according to the present invention which is installed between each protruded side edge, shaped like U in cross section, of the friction pad and a concave anchor portion of the support member, which is formed in association with the protruded side edge, thereby supporting the friction pad, a position at which the pad clip holds the support member is closer to the friction pad than a position of the bottom side of the U shape. With this unique structure, the position at which the pad clip holds the support member moves toward the friction pad with deflection of the pad clip. If the pad clip is turned toward the friction pad, the holding length is elongated to open the pad clip. Therefore, the pad clip remains contact with the support member. A reliable holding of the support member with the pad clip is secured, and there is no chance that play is created between the pad clip and the support member.

A width of the opening of the pad clip where it holds the support member is shorter than a length of the back side of the second U-shaped portion (closer to the friction pad). Therefore, even if the position at which the pad clip holds the support member moves toward the friction pad with deflection of the pad clip, a reliable holding of the support member with the pad clip is secured, and there is no chance that play is created between the pad clip and the support member.

BRIEF DESCRIPTION OF THE DRAWINGS

FIG. 1A is a front view of a pad clip according to a first embodiment of the present invention;

FIG. 1B is a side view of a pad clip shown in FIG. 1B;

FIGS. 6A, 6B and 6C show a pad clip of a second embodiment according to the present invention which are front, side and bottom views of the pad clip;

DESCRIPTION OF THE PREFERRED EMBODIMENTS

Figure 3:
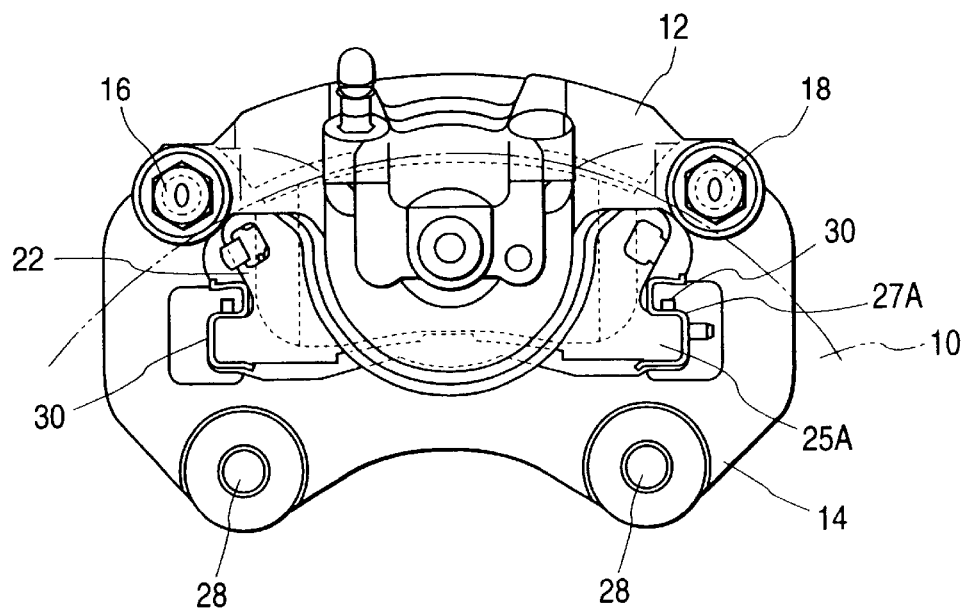
FIG. 3 is a front view of the disc brake shown in FIG. 2.
Figure 4:
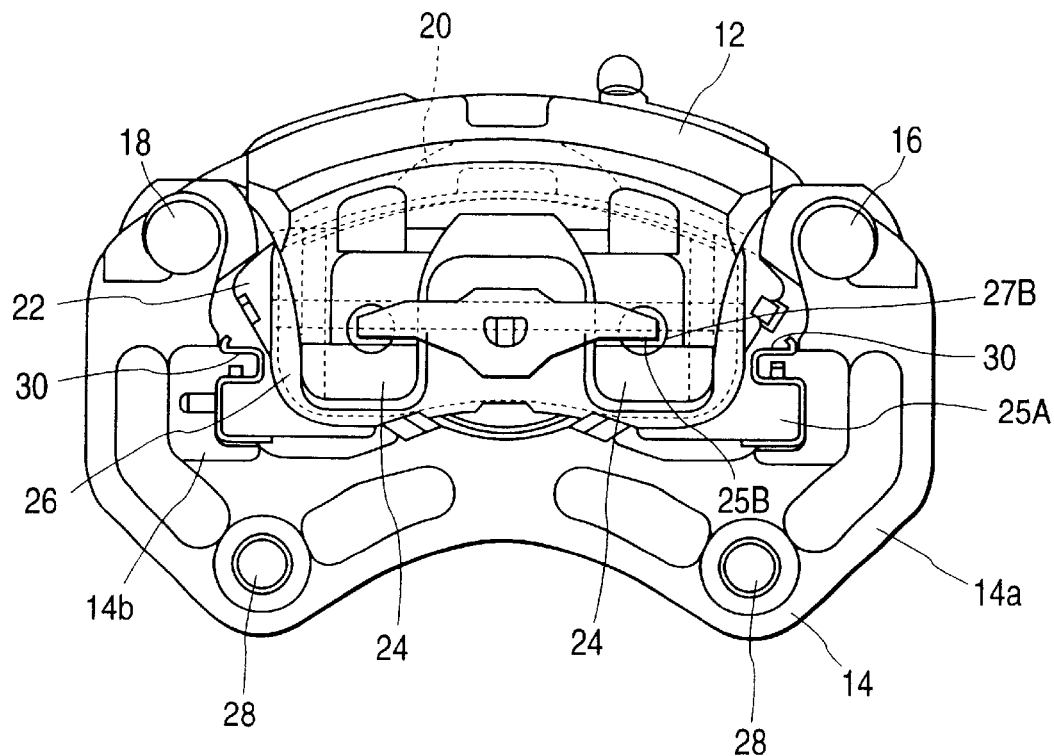
FIG. 4 is a rear view of the disc brake shown in FIG. 2.

Pad clips for a disc brake which are the preferred embodiments of the present invention will be described with reference to the accompanying drawings. A disc brake with pad clips attached thereto will be described with reference to FIGS. 2, 3 and 4, which are plan, front and rear views of the disc brakes, respectively (the rear view of FIG. 4 is the result of turning the view of the disc brake when viewed in the direction C of an arrow in FIG. 2). In the disc brake shown in those figures, a caliper 12 straddles a rotor 10, and is movable in the axial direction of the rotor 10 while being guided by a pair of guide pins 16 and 18. Those guide pins are supported by a support member 14 mounted on a vehicle body, while being arranged parallel to each other. A hydraulic cylinder 20 is provided on the inner side of the caliper 12. An inner pad (friction pad) 22 may be pressed against the inner side surface of the rotor 10 by this hydraulic cylinder. With a movement of the caliper 12 that is caused by a counter force from the inner pad 22, caliper claws 24 press an outer pad (friction pad) 26 against the outer side surface.

The support member 14 is disposed astride the rotor 10. A first side surface 14a of the support member 14 is confronted with the inner surface of the rotor 10. The support member 14 is fastened to the vehicle body by means of bolts inserted into mounting holes 28. A second side surface 14b of the support member 14 is confronted with the outer surface of the rotor 10. Mounting positions for the guide pins 16 and 18 are located outwardly of peripheral edge of the rotor 10. An inner pad 22 is mounted on the support member 14 in a state that the inner pad 22 is movable in the axial direction of the rotor 10 and bears a rotational torque generated when the disc brake operates for braking. Projections 25A are formed on both side edges of the inner pad 22. Grooved portions 27A are formed in the first side surface 14a of the support member 14 at locations corresponding to the projections 25A of the inner pad. Those concave-convex fitting structures are used as anchor portions. When the hydraulic cylinder 20 of the caliper 12 is operated, the inner pad 22 is guided by the fitting structures and pressed against the rotor 10. When the inner pad 22 will turn with rotation of the rotor 10, the fitting structures function as anchors and bear the braking torque.

Figure 2:
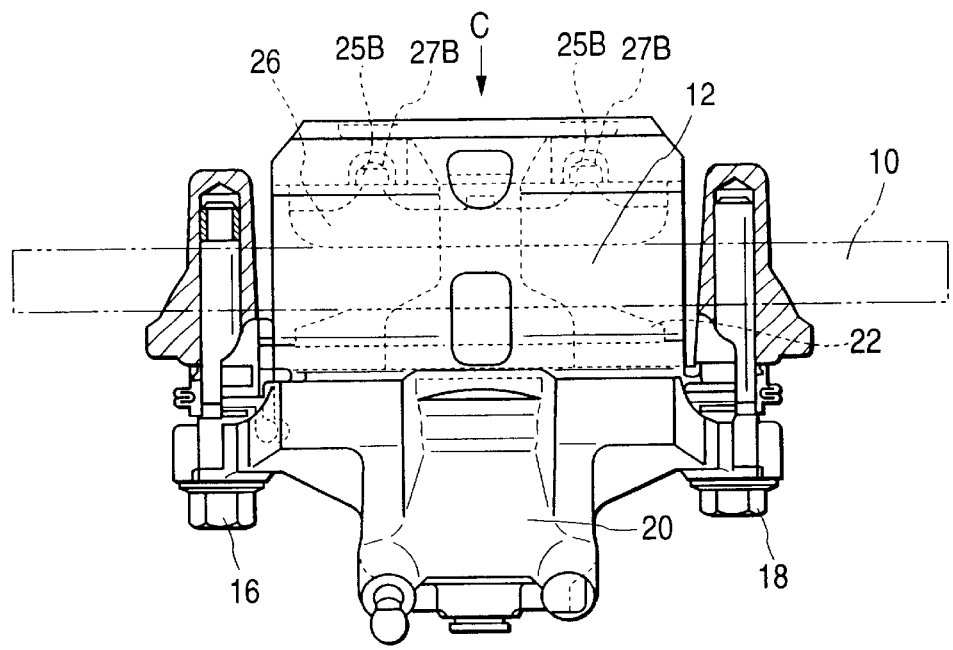
FIG. 2 is a plan view showing a disc brake into which pad clips constructed according to the present invention are assembled.

A counter force of the inner pad 22 when it is pressed causes the caliper 12 to move to the inner side in the axial direction of the rotor 10 while being guided by the guide pins 16 and 18, and the caliper claws 24 press the outer pad 26 against the rotor 10. A couple of projections 25B, as shown in FIGS. 2 and 4, are provided on the reverse side of a back plate of the outer pad 26. The projections 25B are respectively fit into groove portions 27B, which are formed in the caliper claws 24 arranged in a bifurcating fashion. A braking torque acting on the outer pad 26 when the disc brake is operated is transmitted to the caliper 12, and is beared by the support member through the guide pin 16 (or 18).

A pad clip 30 for a disc brake, which is a first embodiment of the present invention, will be described with reference to FIGS. 1, 3 and 4. FIG. 1 is an enlarge view showing each of the pad clips 30 assembled into the disc brake shown in FIGS. 3 and 4. FIG. 1A is a front view of the pad clip 30 for a disc brake (referred to simply as a pad clip 30), and FIG. 1B is a side view showing the pad clip 30. In FIGS. 1, 3 and 4, the pad clips 30 are inserted into the anchor portions at the run-in and run-out locations of the rotor 10, and each of them is located between the inner pad (friction pad) 22 and the support member 14. Presence of the pad clips 30 reduces sliding resistance.

As shown in FIG. 3, concave-convex fitting structures are formed between the inner pad 22 and the support member 14 for holding the pads and serving as anchors in order to guide the inner pad 22 in the axial direction (vertical to the drawing of FIG. 3) of the rotor 10. In this embodiment, the projections 25A are formed on both side end faces of the inner pad 22. The grooved portions 27A are formed in the anchor portions of the support member 14, which are confronted with both side end faces of the inner pad 22. The projections 25A are fit into the grooved portions 27A, respectively. The pad clip 30 is placed in a gap between the projection 25A and the grooved portion 27A in each concave-convex fitting structure.

The pad clip 30 includes a first U-shaped portion 31 which is shaped like U in cross section, and a second U-shaped portion 33, shaped also like U in cross section. Both the first and second U-shaped portion are provided on the inner side of the rotor 10. A side 31$a$ is common to both the first and second U-shaped portions 31 and 33, and those U-shaped portions are continuous to each other. The first and second U-shaped portions 31 and 33 are oppositely directed. The first U-shaped portion 31 is fit into the corresponding grooved portion 27A. The U-shaped portion 33 is fit to a projection 14A (indicated by a two-dot chain line) of the support member 14, which is associated with the second U-shaped portion 33. More specifically, the first U-shaped portion 31 is defined by an anchor piece (bottom side) 31$b$ along an anchor face 27A as the back side of the concave-convex fitting structure, upper and lower sides 31$a$ and 31$c$, which are substantially horizontally bent at the upper and lower ends of the anchor piece 31$b$ while being oppositely arranged. The second U-shaped portion 33 is defined by a lower side 31$a$ (that is upper side 31$a$ of the first U-shaped portion 31), an upper side 33$a$, and a vertical side 33$b$. The lower side 3$a$ and the upper side 33$a$ are substantially horizontally bent at the upper and lower ends of the vertical side 33$b$, while being oppositely arranged. The lower side 31$a$ and the upper side 33$a$ are fit to the projection 14A, and at this time the vertical side 33$b$ remains a little spaced from the end face of the projection 14A. The end portion of the upper side 33$a$ is bent upward to form an upstanding piece 35, which extends toward the outer periphery of the rotor 10 and is parallel to the anchor piece 31$b$. Specifically, the upstanding piece 35 is located closer to the inner pad 22 than the anchor piece 31$b$ by a distance La, that is, closer to the center of the rotor 10. A width Ma of the opening of the second U-shaped portion 33, that is, a length between the upper side 33$a$ and the lower side 31$a$, is shorter than the length of the vertical side 33$b$ (the back side of the second U-shaped portion 33, closer to the friction pad). Accordingly, the entrance of the second U-shaped portion 33 is narrow. The lower side 31$a$ of the first U-shaped portion 31 is bent at both ends of (as viewed horizontally in FIG. 1A) toward the upper side 33$a$ to form holder portions 37, each shaped like V in cross section, for holding the projection 14A of the support member 14.

To attach the pad clip 30 thus constructed to the support member 14, the first U-shaped portion 31 is brought into contact with the grooved portion 27A of the anchor portion of the support member 14, and the second U-shaped portion 33 is applied to the projection 14A such that the lower side 31$a$ and the upper side 33$a$ are fit to the projection 14A, and at this time the vertical side 33$b$ remains a little spaced from the end face of the projection 14A. The holder portions 37 of the pad clips 30 firmly hold the projections 14A of the support member 14 so as to prevent the clips from separating from the projections 14A. The projections 25A, which are formed on both side end faces of the inner pad 22, are inserted into the first U-shaped portions 31 of the pad clips 30, respectively, whereby the inner pad 22 is guided in the axial direction (vertical to the drawing of FIG. 3) of the rotor 10. When the disc brake is operated, the inner pad 22 receives a braking torque. Then, the lower side 31$c$ of each pad clip 30 is resiliently deformed, and the inner pad 22 lowers. Therefore, each pad clip 30 is turned toward the center of the rotor 10. At this time, a contact point Na on the upper inner wall of the opening of the second U-shaped portion 33, which holds the projection 14A of the support member 14, will move to a contact point Nb located on the left side as viewed in the drawing. A distance Qa between a point Nc on the lower inner wall of the opening of the second U-shaped portion 33, which holds the projection 14A of the support member 14, and the contact point Na on the upper wall of the opening is shorter than a distance between the contact points Nc and Nb after it is moved. As a result, when the point Na moves, a force acts so as to open the opening of the second U-shaped portion 33 and, the contact point Na remains contact with the projection 14A of the support member 14. Therefore, there is no chance that a gap (play) is formed between the support member 14 and the pad clip 30.

Figure 5:
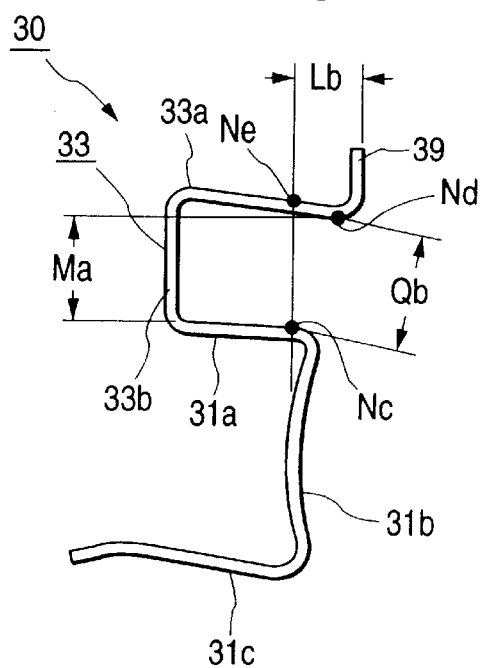
FIG. 5 is a diagram to explain an operation of the pad clip according to the present invention.
Figure 7:
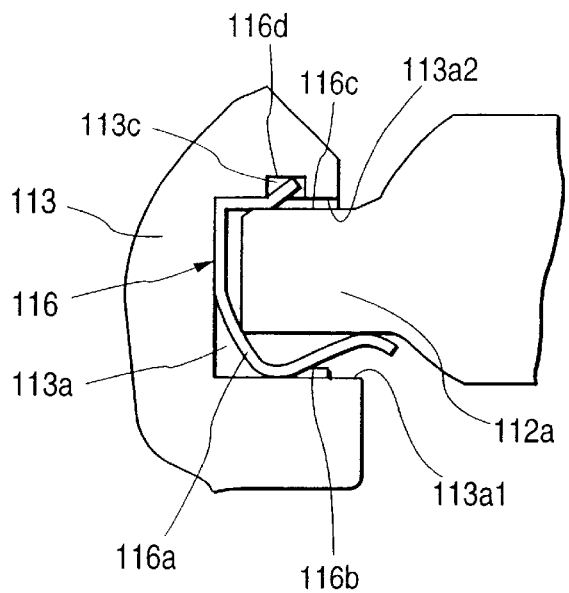
FIG. 7 is a diagram useful explaining a conventional pad clip for a disc brake.
Figure 8A:
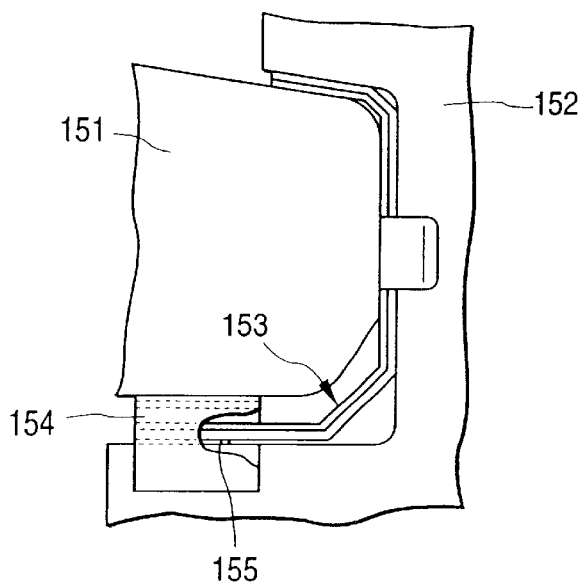
FIGS. 8A and 8B are diagrams explaining another conventional pad clip for a disc brake.
Figure 8B:
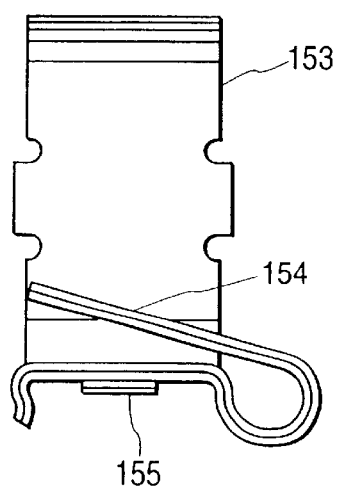

Let us consider a pad clip 30 in which an upstanding piece 39 is located closer to the side opposite to the friction pad than the anchor piece 31$b$, that is, apart from the center of the rotor 10 by a distance Lb as shown in FIG. 5. As in the previous case, a width Ma of the opening of the second U-shaped portion 33, that is, a length between the upper side 33$a$ and the lower side 31$a$, is shorter than the length of the vertical side 33$b$ (the back side of the second U-shaped portion 33, closer to the friction pad). Accordingly, the entrance of the second U-shaped portion 33 is narrow.

As in the previous case, the inner pad 22 receives a braking torque, and the lower side 31$c$ of each pad clip 30 is resiliently deformed. Then the inner pad 22 lowers, and each pad clip 30 is turned toward the center of the rotor 10. At this time, a contact point Nd on the upper inner wall of the opening of the second U-shaped portion 33 which holds the projection 14A of the support member 14, will angularly move to a point Ne located on the left side as viewed in the drawing with a point Nc as a fulcrum. A distance Qb between the points Nd and Nc on the upper and lower walls of the opening which holds the projection 14A of the support member 14 is longer than a distance between the points Nc and Ne after it is moved. The contact Nd of the opening of the second U-shaped portion 33 separates from the projection 14A of the support member 14. As a result, a gap (play) is formed between the support member 14 and the pad clip 30. With the presence of the gap, there is the possibility that vibrations and noisy sounds are generated between the support member 14 and the pad clip 30.

Another pad clip 30 for a disc brake, which is a second embodiment of the present invention, will be described with reference to FIGS. 6A to 6C. FIG. 6A is a front view showing a pad clip 30A for a disc brake (referred to as a pad clip 30A), FIG. 6B is a side views showing the pad clip 30A, and FIG. 6C is a bottom view showing the same. In these figures, equivalent portions are designated by reference numerals same as in the drawings to explain the first embodiment of the invention.

In the pad clip 30A, both ends (as viewed horizontally in FIGS. 6A and 6C) of the anchor piece 31$b$ are bent toward the support member 14 to form holder portions 41 for holding the support member 14.

In the second embodiment, the pad clip 30*a* more firmly holds the support member 14 since the support member 14 is held with the holder portions 41 in a holding manner. Therefore, there is a less chance that a gap (play) is formed between the pad clip 30*a* and the support member 14, and vibrations and noisy sounds are generated as the result of the gap.

As seen from the foregoing description, in the pad clip according to the present invention, a position at which the pad clip holds the support member is closer to the friction pad than a position of the bottom side of the U-shaped portion supporting the friction pad. With this unique structure, if the pad clip is turned toward the friction pad by deflection of the pad clip, the pad clip remains contact with the support member. A reliable holding of the support member with the pad clip is secured, and there is no chance that play is generated between the pad clip and the support member. Therefore, vibrations and noisy sounds are not generated.

A width of the opening of the pad clip where it holds the support member is shorter than a length of the back side of the second U-shaped portion. Therefore, even if the position at which the pad clip holds the support member moves toward the friction pad with deflection of the pad clip, a reliable holding of the support member with the pad clip is secured, and there is no chance that play is generated between the pad clip and the support member.

While only certain embodiments of the present invention have been specifically described herein, it will be apparent that numerous modifications may be made thereto without departing from the spirit and scope of the present invention.

The present invention is based on Japanese Patent Application No. Hei. 10-336258 which is incorporated herein by reference.

What is claimed is:

1. A pad clip for a disc brake including at least one friction pad being disposed astride a rotor and having side edge portions with U-shaped projected portions, and a support member supporting braking force from the friction pad and having anchor portions with U-shaped grooved portions, said pad clip comprising:

a first U-shaped portion including a first base portion and first side portions, and disposed between the side edge portions of the friction pad and the anchor portions of the support member;

a second U-shaped portion including a second base portion, second side portions and a second opening portion, and connected to one of first side portions of said first U-shaped portion; and a third side portion connected to said second U-shaped portion, and disposed substantially perpendicular to one of second side portions of said second U-shaped portion and parallel to said first base portion of said first U-shaped portion, wherein said pad clip supports the friction pad between the side edge portions of the friction pad and the anchor portions of the support member, and said third side portion is positioned closer to the friction pad than said first base portion of said first U-shaped portion.

2. The pad clip according to claim 1, wherein said first U-shaped portion further includes first holder portions disposed on said first side portions of said first U-shaped portion.

3. The pad clip according to claim 2, wherein said first holder portions are V-shaped.

4. The pad clip according to claim 2, wherein said first U-shaped portion further includes second holder portions on said first base portion of said first U-shaped portion.

5. The pad clip according to claim 1, wherein the width of said second opening portion of said second U-shaped portion is shorter than the length of said second base portion of said second U-shaped portion.

6. The pad clip according to claim 5, wherein said first U-shaped portion further includes first holder portions disposed on said first side portions of said first U-shaped portion.

7. The pad clip according to claim 6, wherein said first holder portions are V-shaped.

8. The pad clip according to claim 6, wherein said first U-shaped portion further includes second holder portions on said first base portion of said first U-shaped portion.

* * * * *